United States Patent [19]

Sarada

[11] Patent Number: 4,501,793

[45] Date of Patent: Feb. 26, 1985

[54] SURFACTANT TREATED POLYOLEFINIC MICROPOROUS MATERIALS CAPABLE OF MULTIPLE RE-WETTING WITH AQUEOUS SOLUTIONS

[75] Inventor: Thyagaraja Sarada, Norwalk, Conn.

[73] Assignee: Celanese Corporation, New York, N.Y.

[21] Appl. No.: 505,539

[22] Filed: Jun. 17, 1983

[51] Int. Cl.$^3$ .......................... B32B 3/26; D02G 3/00
[52] U.S. Cl. .............................. 428/315.5; 210/500.2; 428/376
[58] Field of Search ............... 428/315.5, 315.7, 315.9, 428/376; 210/500.2

[56] References Cited

U.S. PATENT DOCUMENTS

| | | | |
|---|---|---|---|
| 3,853,601 | 12/1974 | Taskier | 428/315.7 |
| 3,947,537 | 3/1976 | Buntin et al. | 264/137 |
| 4,290,987 | 9/1981 | Soehngen et al. | 428/376 |

Primary Examiner—William J. Van Balen

Attorney, Agent, or Firm—Burns, Doane, Swecker & Mathis

[57] ABSTRACT

Disclosed are hydrophilic polyolefinic microporous materials and a method for the preparation thereof. Such materials are prepared by impregnating a normally hydrophobic polyolefinic microporous substrate material with a solution of a nonionic alkylphenoxy poly(ethyleneoxy) ethanol surfactant having an HLB of from about 10 to 15 in a solvent system comprising from about 55 to about 65 volume percent methanol or acetone and from about 35 to about 45 volume percent water. It has been discovered that polyolefinic microporous materials rendered hydrophilic by this technique not only wet rapidly, but in addition may be multiply re-wet with aqueous solutions, such as aqueous alkali solutions, with excellent retention of their hydrophilic properties. The hydrophilic polyolefinic microporous materials of this invention find particular application as battery separators and as membranes for use in various chemical, medical and biotechnical processes.

14 Claims, No Drawings

SURFACTANT TREATED POLYOLEFINIC MICROPOROUS MATERIALS CAPABLE OF MULTIPLE RE-WETTING WITH AQUEOUS SOLUTIONS

BACKGROUND OF THE INVENTION

The instant invention relates to hydropholic microporous membranes, of the type wherein a hydrophilic polyolefinic microporous material is impregnated with a surfactant in order to impart hydrophilic properties, such as water permeability, to the material. The present invention particularly relates to hydrophilic microporous materials of the aforementioned type which are rapidly wettable, particularly by aqueous solutions, and in addition may be multiply re-wet, i.e., re-used, without significant surfactant wash-out and an attendant loss of hydrophilic properties of the material upon re-wetting.

Polyolefinic microporous materials, such as for example polyolefinic microporous films and hollow fibers, are well known to those skilled in the art. See, for example, U.S. Pat. Nos. 4,020,230; 4,055,696; 4,290,987; 3,839,516; 3,801,404, 3,679,538; 3,558,764; and 3,426,754. Due to the advantageous properties of these materials, such as chemical inertness and stability, physiological compatibility and safety, as well as the unique porous structure thereof, polyolefinic microporous films and hollow fibers have found utility in a wide variety of applications such as gas-breathing water barriers, gas-liquid transfer mediums, and membranes for use in blood oxygenation and in various separation processes.

One disadvantage of the polyolefinic microporous membranes which in the past has limited the number of applications in which these materials may be utilized has been their hydrophobic nature. Due to the hydrophobic nature of these materials, despite their other desirable physical characteristics, the polyolefinic microporous membranes have not been readily usable in those applications which require an aqueous permeable and/or wettable membrane, such as for example battery separators and membranes for use in blood plasmaphersis.

One approach to this problem has been to treat the normally hydrophobic polyolefinic microporous material with various surfactants in order to impart hydrophilic characteristics such as water permeability and wettability thereto. U.S. Pat. No. 3,853,601, for example, discloses polyolefinic microporous films such as polypropylene microporous films, which are rendered hydrophilic by treatment with a silicon glycol copolymeric surfactant. In other embodiments, the microporous film may be impregnated with a combination of a silicon glycol copolymeric surfactant and a cationic imidazoline tertiary amine. The disclosed surfactants are applied to the exemplified polyolefinic microporous films by contactng the film with a dilute solution of from about 1 to 10% by weight of the surfactant and/or surfactants in an organic solvent such as acetone, methanol, ethanol or isopropyl in order to produce an "add-on" of the surfactant to the microporous film of from about 2 to about 20 percent by weight, based on the weight of the uncoated microporous film. Hydrophilic microporous polyolefinic films produced by this method are described as being rapidly wettable and useful as battery separators.

Similarly, U.S. Pat. No. 4,290,987 teaches that polyolefinlic microporous hollow fibers may be rendered hydrophilic by treatment with surfactants such as polyvinylpyrrolidone (PVP), various high molecular weight condensation products of ethylene oxide with a hydrophobic base formed by the condensation of propylene oxide with propylene glycol (e.g., the Pluronics ®), and various polyoxyalkylene derivatives of hexitol anhydride partial long chain fatty acid esters (e.g., the Tweens ®).

In addition to the foregoing surfactants, a variety of other surfactants have also been examined for use in rendering polyolefinic microporous materials hydrophilic. U.S. Pat. No. 4,298,666, for example, describes the use of phosphate esters such as ethoxylated 2-ethylhexyl phosphate in the treatment of polyolefinic microporous films.

A wide variety of various other surfactants which have heretofore been employed in order to improve the hydrophilic characteristics of polyolefinic films are further described in Canadian Pat. No. 981,991, such a hexachlorophene modified soaps, polypropoxylated quaternary ammonium chlorides, organic phosphate esters, imidazolines, fatty acids and their alkali metal salts, and various fatty and alkali amines.

Wettable polypropylene non-woven mats, suitable for use as battery separators, have also heretofore been developed by the prior art. U.S. Pat. No. 3,947,537, for example, describes non-woven polypropylene mats having a pore size of less than 25 microns and a porosity in excess of 50% which are rendered wettable by impregnation with from about 0.3 to 1.0 percent by weight of an anionic surfactant such as sodium dioctylsulfosuccinate or nonionic polyoxyethylene oxy compounds such as nonylphenoxy poly(ethyleneoxy) ethanol (i.e., Igepal ® CO-730) or alkyarylpolyether alcohol compounds.

Similar battery separators of the porous non-woven mat type are also disclosed in U.S. Pat. Nos. 3,870,567; 3,918,995; and 3,933,525. In each of these patents, the non-woven mats are prepared from polypropylene fibers containing a wetting agent system that is insoluble in battery electrolyte and tends to bloom (i.e., rise to the surface of the polypropylene fibers) under conditions of use. In the preferred embodiment, the wetting agent system comprises a first nonionic wetting agent having an HLB (Hydrophilic Lypophilic Balance) number of less than 5, and a second wetting agent having an HLB of greater than 5 selected from nonionic and anionic surfactants. Specifically exemplified surfactants include, inter alia, the ethoxylated adducts of polypropylene oxide with propylene glycol (Pluronic ® L-121), nonylphenol ethylene oxide adducts such as Tergitol ® NP-14, TP-9, NP-33 and NP-44; dodecylphenol ethylene oxide adducts such as Tergitol ® 12P-5 and 12-P-6, and alkylarylpolyethers such as Triton ® X-100, as well as a variety of other surfactants based on ethylene oxide.

While the above-described hydrophilic polyolefinic materials are wettable, in varying degrees, with aqueous liquids and are thus suitable for some purposes, the surfactant impregnated polyolefinic materials of the prior art have in general exhibited less than desirable retention of their hydrophilic properties upon repeated use. It has been observed with these systems that many of the surfactants employed therein have a relatively low adhesion to the polyolefinic material, and upon repeated use tend to be washed-out from the polyolefinic material with an attendant loss in the hydrophilic and wettability properties of the polyolefinic material. In battery separator applications, for example, the long term bathing and agitation of the polyolefinic separators by the battery electrolyte produces surfactant wash-out, with a resulting increase in internal electrical resistance as the life of the battery increases. Similarly, in applications such as plasmaphersis (as well as in other filtration processes) passage of the blood plasma (or other liquid to be filtered) through the polyolefinic microporous membrane tends to wash-out the surfactant, with the result that the efficiency of the microporous polyolefinic membrane decreases percipitously over time.

Recently, hydrophilic microporous polyolefinic films have also been developed wherein the water wettability and water permeability properties of the hydrophobic polyolefinic material are improved by grafting the polyolefinic material with a controlled amount of a hydrophilic monomer such as acrylic acid in the presence of a controlled dosage of ionizing radiation. See, e.g., U.S. Pat. No. 4,346,142. Hydrophilic microporous polyolefinic films prepared by the technique disclosed in this patent, due to the chemical attachment of the hydrophilic monomer to the polyolefinic material, do not exhibit transient water permeability properties and thus comprise highly desirable hydrophilic membrane materials. Due to their convenience, it would nonetheless be desirable to provide hydrophilic microporous polyolefinic materials of the surfactant impregnated type having improved surfactant retention and re-wettability properties.

SUMMARY OF THE INVENTION

Accordingly, it is an object of the present invention to provide an improved hydrophilic microporous polyolefinic material of the surfactant impregnated type.

It is a specific object of the present invention to provide a hydrophilic microporous polyolefinic material of the surfactant impregnated type which exhibits not only low electrical resistance in aqueous medium, excellent wettability and water permeability, but in addition improved retention of these properties during use.

It is a further object of the instant invention to provide a process for preparing a hydrophobic microporous polyolefinic material of the surfactant impregnated type having the combination of properties mentioned above.

In accordance with the present invention these and other objects are achieved through the provision of a hydrophilic polyolefinic microporous material which comprises a normally hydrophilic polyolefinic open-celled microporous material impregnated with at least one nonionic alkylphenoxy poly(ethyleneoxy) ethanol surfactant having an HLB (Hydrophilic Lypophilic Balance) number in the range of from about 12 to 15 in an amount sufficient to render the normally hydrophobic material aqueous solution wettable.

Preferred hydrophilic polyolefinic microporous materials within the scope of this invention are prepared by impregnating the normally hydrophobic polyolefinic microporous material with a surfactant solution comprising at least one of the aforementioned alkylphenoxy poly (ethyleneoxy) ethanol surfactants in a solvent system comprising a mixture of from about 55 to about 65 volume percent of methanol or acetone (most preferably about 60 volume percent of methanol or acetone) with from about 35 to about 45 volume percent (most preferably about 40%) of water. The concentration of the surfactant solution, contact time and surfactant add-on are all chosen so as to render the normally hydrophobic polyolefinic microporous material wettable with aqueous solutions.

It has been surprisingly discovered that, in contrast to the more common surfactant-cooled microporous materials of the prior art, the hydrophilic polyolefinic microporous materials prepared by the techniques of this invention possess not only excellent wettability with aqueous solutions, but in addition exhibit an improved retention of their hydrophilic properties, as demonstrated by their ability to be multiply re-wet with aqueous medium. This latter advantage is believed to be due not only to the particular class of surfactants employed herein but also to be due to the impregnation procedure utilized in the preparation of the hydrophilic polyolefinic microporous materials of this invention. In other embodiments, therefore, the present invention thus also provides a method for the preparation of hydrophilic polyolefinic microporous materials having improved wettability and retention of wettability properties which comprises contacting a normally hydrophobic polyolefinic microporous material with a solution of at least one nonionic alkylphenoxy poly (ethyleneoxy) ethanol surfactant having an HLB in the range of from about 10 to 15 in a solvent mixture comprising from about 55 to 65 volume percent methanol or acetone and from about 35 to 45 volume percent of water in a manner sufficient to render said normally hydrophobic polyolefinic microporous material wettable with aqueous solutions.

In still other embodiments the present invention further provides hydrophilic polyolefinic microporous materials having improved wettability and retention of hydrophilic properties which are prepared by the aforementioned method.

Other objects, features and advantages of the present invention, as well as the preferred modes of operation thereof, will become apparent to those skilled in the art from the following detailed description of the preferred embodiments.

DESCRIPTION OF THE PREFERRED EMBODIMENTS

The present invention is based upon the discovery that the class of alkylphenoxy poly(ethyleneoxy) ethanol surfactants having an HLB in the range of from about 10 to about 15 comprise unusually good surfactants for use in the preparation of hydrophilic polyolefinic microporous materials, providing hydrophilic polyolefinic microporous materials having excellent wettability characteristics. It has been further discovered that the adhesion of the aforementioned surfactants to the polyolefinic microporous material is improved by impregnating the polyolefinic microporous maerial with the surfactant in the form of surfactant solution containing as the solvent from about 55 to about 65 volume percent methanol or acetone and from about 35 to about 45 volume percent of water. Best results are obtained with a solvent mixture comprising about 60 volume percent of acetone or methanol and about 40 volume percent of water. When applied to the polyolefinic microporous material by this technique, the aforementioned alkylphenoxy poly(ethyleneoxy) ethanol surfactants exhibit strong adhesion to the polyolefinic microporous materials and provide hydrophilic polyolefinic membranes having improved retention of their hydrophilic properties, as demonstrated by their ability to be mutiply re-wet with aqueous media.

As a result of these significant advantageous properties, the hydrophilic polyolefinic microporous materials of this invention are highly desirable for use as membranes in environments wherein hydrophilic properties are required, such as for example as membranes for use in separation and filtration processes such as, e.g., plasmaphersis. In addition, the chemical resistance provided by polyolefin membranes together with the advantageous wettability characteristics of the surfactant treated membranes of this invention make such membranes ideal materials for use as battery separators. Battery separators prepared from the microporous membranes of this invention typically exhibit, for example, an electrical resistance of less than 15 milliohms-in.$^2$, and more usually less than 10 milliohms-in.$^2$, as measured by the technique described in U.S. Pat. No. 4,298,666, the entirety of which is herein incorporated by reference and relied on in its entirety.

The alkylphenoxy poly(ethyleneoxy) ethanol surfactants employed in the hydrophilic polyolefinic microporous materials of this invention, as mentioned above, possess an HLB (Hydrophilic Lipophilic Balance) of from about 10 to 15. Such surfactants are well known to those skilled in the art, and are readily commercially available. Suitable surfactants include, for example, the 500 and 600 series compounds sold under the tradename Igepal ® by the GAF Corporation, such as Igepal RC-520, RC-620, RC-630, CO-520, CO-530, CO-610, CO-630, CO-660, CO-720, CA-520, CA-620 and CA-630. Preferred alkylphenoxy poly(ethyleneoxy) ethanol surfactants for use in the hydrophilic polyolefinic microporous materials in this invention have an HLB of from about 12 to about 13, such as for example, Igepal RC-620, RC-630, CO-610, CO-630, CO-660, CA-620 and CA-630, of which Igepal CO-610, CO-630, and RC-630 have been found to give particularly good results.

The polyolefinic microporous materials rendered hydrophilic with the above surfactants may comprise any suitable polyolefinic microporous material well known in the art. Generally, the polyolefinic microporous material will be in the form of a flat film or sheet or hollow fiber, but may in addition be in any other configuration known to those skilled in the art such as hollow tubes, fabrics, laminates, etc. Examples of suitable microporous materials are disclosed for instance in U.S. Pat. Nos. 4,020,230; 4,055,696; 4,290,987; 3,839,516; 3,801,404; 3,679,538; 3,558,764; and 3,426,754, the entirety of which are herein incorporated by reference.

The microporous membranes employed herein may also comprise any suitable polyolefin well known to those skilled in the art. Illustrative examples of suitable polyolefins include polyethylene, polypropylene, poly-3-methyl butene-1, poly-4-methyl pentene-1, copolymers of ethylene, propylene, 3-methyl butene-1, or 4-methyl pentene-1 with each other or with minor amounts of other olefins, e.g., copolymers of ethylene and propylene, copolymers of a major amount of 3-methyl butene-1 and a minor amount of a straight chain n-alkene having from 2 to 18 carbon atoms such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. The polyolefinic material may also include small amounts (e.g., less than about 20% by weight) of other materials which may be copolymerized or blended therewith, but which do not substantially adversely affect the characteristics of the polyolefinic material. A particularly preferred polyolefin is isotactic polypropylene having a weight average molecular weight in the range of from about 50,000 to about 600,000, preferably from about 100,000 to about 600,000; and a melt index in the range of from about 0.6 to about 35, preferably from about 0.6 to about 15, and most preferably from about 0.6 to about 8 (e.g., from about 1 to 5).

Also particularly preferred is high density polyethylene having a density greater than 0.960; a weight average molecular weight of from 50,000 to 600,000, preferably from about 100,000 to about 600,000; and a melt index of from about 0.5 to about 15, preferably from about 0.6 to about 8 and most preferably from about 0.6 to 5.

Preferred polyolefinic microporous materials for use in preparing the hydrophilic membranes of this invention are of the open-celled type, i.e., of the type in which the pores are essentially interconnected through tortuous paths which may extend from one exterior surface or surface region to another. Such preferred membranes also exhibit a reduced bulk density as compared with the density of the corresponding non-porous structures from which they are made; a crystallinity of at least about 30 percent, more preferably from about 50 to 100 percent as determined by the x-ray method described by R. G. Quynn et al in the *Journal of Applied Polymer Science*, Vol. 2, No. 5, pp. 166–173 (1959); an average pore size of from about 100 to about 12,000 Angstroms (preferably from about 100 to 5,000 Angstroms); a surface area of at least about 10 m$^2$/g (preferably from about 20 to 100 m$^2$/g), as measured by the BET method, which is described in detail in the *Journal of the American Chemical Society*, Vol. 60, pp. 309–316 (1938); and a porosity of from about 40 to about 90% as measured by mercury porosimetry.

Preferred polyolefinic microporous membranes for use in this invention are further characterized by an oxygen flux of at least 10, preferably in the range of from about 30 to about 300 and most preferably in the range of from about 100 to about 300 cc/cm$^2$. min. at 10 psi. The oxygen flux, $J_g$, of a microporous membrane is a measure of its effective permeability, and is determined by passing oxygen gas through a sample of microporous membrane at a pressure of 10 psi and collecting the same. The volume of the gas collected over a period of time is then used to calculate the gas flux in cc/cm$^2$. min. of the sample of microporous membrane according to the equation:

$$J_g = V/[(A)(T)]$$

wherein V is the volume of gas collected; A is the surface area of the microporous membrane (for hollow fiber membranes A is the internal surface area of the hollow fiber); and T is the time in minutes it takes to collect the gas.

As mentioned above, the microporous membranes preferred for use in the preparation of the invention hydrophilic polyolefinic microporous membranes exhibit a reduced bulk density. That is, these membranes have a bulk or overall density lower than the bulk density of corresponding membranes composed of identical polymeric material but having no-open celled or other voidy structure. The term "bulk density" as used herein means the weight per unit of gross or geometric volume of the membrane, where gross volume is determined by immersing a known weight of the film in a vessel partly filled with mercury at 25° C. and atmospheric pressure.

The volumetric rise in the level of mercury is a direct measure of the gross volume. This method is known as the mercury volume-nometer method, and is described in the *Encylopedia of Chemical Technology,* Vol. 4, page 892 (Interscience 1949).

Microporous membranes having the above-described properties have a structure, as shown by various morphological techniques or tests such as electron microscopy, which is characterized by a plurality of elongated, non-porous, interconnecting surface regions or areas which have their access of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the membranes utilized in the present invention. These surface pores or open cells are substantially interconnected through tortuous paths or passageways which extend from one surface region to another surface area or region.

With such a defined or organized morphological structure, the membranes preferred for use herein have a greater proportion of surface area that the pores cover, a greater number of pores, and a more uniform distribution of pores, than other types of microporous membranes. Further, the fibrils present in this type of membrane are more drawn or oriented with respect to the rest of the polymer material in the membrane, and thus contribute to the higher thermal stability of thereof.

Polyolefinic microporous membranes of the above-discussed preferred type are well known to those skilled in the art, and are available commercially from the Celanese Fibers Marketing Company, Charlotte, N.C., under the tradename "Celgard ®". The preparation of this type of microporous membrane is also described in, for example, U.S. Pat. Nos. 3,801,404; 3,839,516; 3,669,538; 3,801,692; 3,843,761; 3,920,785; 4,138,459; 4,257,997; and 4,290,987, among others, the entirety of which are herein incorporated by reference and relied upon in their entirety. Especially preferred polyolefinic microporous film membranes for use in the present invention are prepared by the techniques described in U.S. Pat. Nos. 3,801,404 and 4,257,997. Preferred polyolefinic microporous hollow fiber membranes are most advantageously prepared by the procedures described in U.S. Pat. No. 4,290,987 and in commonly assigned U.S. patent application Ser. No. 349,795, filed Feb. 2, 1982, now U.S. Pat. No. 4,405,688, in the name of James Jay Lowery et al, the entirety of which is also incorporated herein by reference and relied on in its entirety.

The hydrophilic polyolefinic microporous materials of this invention are prepared, as mentioned above, by impregnating the normally hydrophobic polyolefinic microporous substrate membrane with a solution containing one or more of the aforementioned alkylphenoxy poly(ethyleneoxy) ethanol compounds in a solvent mixture comprising from about 55 to 65 volume percent of methanol or acetone and from about 35 to 45 volume percent water. Preferably, the solvent system comprises about 60 volume percent of methanol or acetone (particularly methanol) and about 40 volume percent water. It has been discovered that the use of the aforementioned solvent system achieves a more intimate penetration of the porous structure of the microporous substrate material by the alkylphenoxy poly(ethyleneoxy) ethanol surfactant than obtainable by other solvent systems which have been employed for treating microporous materials. As a result of this improved penetration, the surfactant-treated microporous materials of this invention are substantially less subject to surfactant wash-out, and accordingly exhibit significantly improved retention of their hydrophilic properties, as exemplified by their ability to be multiply re-wet with aqueous solutions. It appears that this enhanced surfactant retention is related not only to the inherent affinity of the alkylphenoxy poly(ethyleneoxy) ethanol surfactant employed herein to the polyolefinic microporous substrate, but in addition to the solvent system employed during impregnation, since polyolefinic microporous substrates impregnated using, e.g., an isopropanol/water solvent mixture did not exhibit the superior surfactant retention characteristic of the preferred hydrophilic membranes of this invention.

The surfactant solution utilized during the impregnation procedure preferably is a dilute solution. In the preferred embodiment, the surfactant solution typically comprises from about 1 to about 10% by weight of one or more of the aforementioned alkylphenoxy poly(ethyleneoxy) ethanol surfactants, more preferably from about 5 to 10% by weight of surfactant.

The polyolefinic microporous substrate material may be impregnated by any method well known to those skilled in the art. A preferred procedure comprises simply immersing the microporous substrate material in the surfactant solution for an amount of time sufficient to produce the desired improvement in the hydrophilic properties of the polyolefinic microporous substrate. If desired, the surfactant solution may be employed in the form of an ultrasonic bath, although this procedure does not appear to be critical to the preparation of the hydrophilic materials of this invention.

The amount of surfactant impregnation, i.e., surfactant "add-on", is preferably adjusted in order to provide hydrophilic membranes which are not only surface wet by aqueous solutions, but in addition are "wet through" by aqueous solutions. This latter term refers to the ability of aqueous solutions to penetrate and be transported through the polyolefinic substrate material. For the purposes of the present invention, the term "wettable" means that the hydrophilic polyolefinic microporous membrane may be "wet through" by aqueous media. The amount of surfactant add-on required for this purpose varies according to the particular aqueous solution which is desired to wet through the hydrophilic polyolefinic microporous membrane. With alkaline KOH battery electrolyte solutions (comprising from about 25 to 45 percent KOH in water), for example, larger amounts of surfactant add-on are often required in order to achieve wet through. Generally, surfactant add-ons of at least 5% by weight, based on the weight of the uncoated microporous substrate, are adequate for this purpose. Best results are obtained with surfactant add-ons of from about 10 to 15% by weight, and most preferably about 12% by weight. Hydrophilic membranes according to this invention having surfactant add-ons within this range have been found to be still wettable even after six months of use. While add-ons greater than 15% by weight may be employed, if desired, the use of such greater amounts of surfactant add-on has been found to be without advantage, the excess over 15% by weight being washed-out of the membrane during use.

The contact time of the polyolefinic microporous substrate with the surfactant solution during the immersion step is not particularly critical, and is usually adjusted in order to achieve the surfactant add-ons described above. Typical contact times generally comprise from about 10 seconds to about one hour or more, and will vary according to the concentration of the surfactant solution, the desired add-on, the thickness of the polyolefinic membrane, etc. Suitable contact times may readily be determined given the teachings of this invention by those skilled in the art.

The invention is additionally illustrated in connection with the following Examples which are to be considered as illustrative of the present invention. It should be understood, however, that the invention is not limited to the specific details of the Examples.

EXAMPLE I

A series of hydrophilic polypropylene microporous hollow fibers were prepared by impregnating Celgard ® polypropylene microporous hollow fibers with a surfactant solution comprising a 1% by weight solution of the surfactant in a 60/40 methanol-water solvent mixture. In each of these experiments, six, two-inch long filaments of polypropylene microporous hollow fiber were cut and attached to a binder clip. The resulting bundle of filaments was then immersed in an ultrasonic bath containing the above-described surfactant solution. After 10 minutes of immersion in the ultrasonic bath, the microporous hollow fiber bundle was removed and allowed to dry. Upon drying the sample was immersed in water to determine wettability. If the sample would wet, it was then re-dried, and the wetting-drying procedure repeated three times to test the re-wettability characteristics of the sample.

The surfactants employed in these experiments included American Cyanamid Aerosol OT-100 (dioctyl ester of sodium sulfosuccinic acid), IB-45 (diisobutyl ester of sodium sulfosuccinic acid), A-268 (disodium isodecyl sulfosuccinate), OS (sodium isopropyl naphthalene sulfonate), and 18 (disodium N-octadecylsulfosuccinate); BASF Pluronic L-35 (HLB 18.5), L-43 (HLB 12.0), L-101 (HLB 1.0), F-68 (HLB 29.0), and F-108 (HLB 27.0), which comprise condensates of ethylene oxide with hydrophobic bases formed by condensing propylene oxide with propylene glycol; GAF polyvinylpyrrolidone K15, K30, K60 and K90; GAF Igepal CA-520 (octylphenoxy poly(ethyleneoxy) ethanol having an HLB of 10.0), CA-620 (octylphenoxy poly(ethyleneoxy) ethanol having an HLB of 12), CA-630 (octylphenoxy poly(ethyleneoxy) ethanol having an HLB of 13); RC-520 (dodecylphenoxy poly(ethyleneoxy) ethanol), RC-620 (dodecylphenoxy poly(ethyleneoxy) ethanol), RC-630 (dodecylphenoxy poly(ethyleneoxy) ethanol), CO-520 (nonylphenoxy poly(ethyleneoxy) ethanol having an HLB of 10.0), CO-630 (nonylphenoxy poly(ethyleneoxy) ethanol having an HLB of 13.0), CO-660 (nonylphenoxy poly(ethyleneoxy) ethanol having an HLB of 13.2), and CO-720 (nonylphenoxy poly(ethyleneoxy) ethanol having an HLB of 15); and ICI Tween 20 (polyoxyethylene (20) sorbitan monolaurate having an HLB of 16.7), 21 (polyoxyethylene sorbitan laurate having an HLB of 13.3), 40 (polyoxyethylene (20) sorbitan monopalmitate having an HLB of 15.6), 60 (polyoxyethylene (20) sorbitan monostearate having an HLB of 14.9), 80 (polyoxyethylene (20) sorbitan monooleate having an HLB of 15.0), 81 (polyoxyethylene (5) sorbitan monooleate having an HLB of 10.0) and 85 (polyoxyethylene (20) sorbitan trioleate) having an HLB of 11.0).

The results of these experiments are set forth in Table I, wherein a "1" signifies wetting of the hollow fibers (measured visually, "0" signifies no wetting of the fiber occurred, and "½" signifies partial wetting of the fiber occurred. As mentioned above, microporous hollow fibers found to be either non-wetting ("0") or only partially wetting ("½") during the first wetting cycle were not examined for re-wettability characteristics.

TABLE I

| Surfactant | 1st Wetting Cycle | 2nd Wetting Cycle | 3rd Wetting Cycle |
| --- | --- | --- | --- |
| Aerosol OT-100 | ½ | — | — |
| Aerosol IB-45 | 0 | — | — |
| Aerosol A-268 | 0 | — | — |
| Aerosol OS | 0 | — | — |
| Aerosol 18 | 0 | — | — |
| Pluronic L-35 | 0 | — | — |
| Pluronic L-43 | 0 | | |
| Pluronic L-101 | ½ | ½ | — |
| Pluronic F-68 | 0 | — | — |
| Pluronic F-108 | 0 | — | — |
| GAF PVP - K15 | 0 | — | — |
| GAF PVP - K30 | 0 | — | — |
| GAF PVP - K60 | 0 | — | — |
| GAF PVP - K90 | 0 | — | — |
| Igepal RC-520 | 1 | 1 | 1 |
| Igepal RC-620 | 1 | 1 | 1 |
| Igepal RC-630 | 1 | 1 | 1 |
| Igepal CO-520 | 1 | 1 | 1 |
| Igepal CO-630 | 1 | 1 | 1 |
| Igepal CO-660 | 1 | 1 | 1 |
| Igepal CO-720 | 1 | 1 | 1 |
| Igepal CA-520 | 1 | 1 | 1 |
| Igepal CA 620 | 1 | 1 | 1 |
| Igepal CA 630 | 1 | 1 | 1 |
| Tween 20 | 1 | 1 | 1 |
| Tween 21 | 1 | 1 | 1 |
| Tween 40 | 1 | 1 | 1 |
| Tween 60 | 1 | 1 | 1 |
| Tween 80 | 1 | 1 | 1 |
| Tween 81 | 1 | 1 | 1 |
| Tween 85 | 1 | 1 | 1 |

As can be seen from Table I, hydrophilic polypropylene microporous hollow fibers prepared in accordance with the principles of this invention possess not only excellent wetting characteristics, but in addition may be multiply re-wet over a number of wetting/drying cycles, demonstrating an excellent retention of hydrophilic properties upon repeated use. This result is particularly surprising since even when prepared using a 60/40 methanol-water solvent system, polypropylene microporous hollow fibers impregnated with other surfactants which have been suggested for this purpose by the prior art, such as the Pluronic series of surfactants and polyvinylpyrrolidone (c.f. U.S. Pat. No. 4,290,987), possessed only poor wettability and were not capable of being multiply re-wet. In this regard, it is to be noted that while polypropylene microporous hollow fibers impregnated with the Tweens ® did exhibit desirable wetting characteristics when prepared with a 60/40 methanol-water solvent system, comparable results are not to be expected when the Tweens ® are impregnated using other solvent systems. As discussed above, it has been found that the substitution of isopropanol for the methanol or acetone component of the solvent system using during impregnation produces microporous materials having inferior re-wetting characteristics. This latter fact further supports the unexpected nature of this invention and highlights the great unpredictability associated with the preparation of hydrophilic polyolefinic microporous materials having desirable retention of their hydrophilic properties.

EXAMPLE II

Following procedures similar to Example I, a series of hydrophilic Celgard ® 2400 polypropylene microporous films were prepared by immersing the microporous substrate films in an ultrasonic bath of various 60/40 methanol-water surfactant solutions, each of which contained identical concentrations of surfactant. The surfactants used for these tests included Igepal ® 510, 610, and 630; and Pluronic ® L43, F68 and L61. Immersion times ranged from 15 to 20 minutes.

Similarly to the results of Example I, the films treated with surfactants within the scope of this invention, the Igepals, exhibited excellent wet through characteristics, whereas films treated with the Pluronics ® surfactants were found not to be wettable.

The principles, preferred embodiments and modes of operation of the present invention have been described in the foregoing specification. The invention which is intended to be protected herein, however, is not to be construed as limited to the particular forms disclosed since those are to be regarded as illustrative rather than restrictive. Variations and changes may be made by those skilled in the art without departing from the spirit of the invention.

What is claimed is:

1. A hydrophilic polyolefinic microporous material comprising a normally hydrophobic polyolefinic open-celled microporous substrate impregnated with at least one nonionic surfactant of the class of alkylphenoxy poly(ethyleneoxy) ethanol compounds having an HLB in the range of from about 10 to about 15 in an amount sufficient to render said hydrophobic polyolefinic microporous substrate wettable with aqueous solutions; said surfactant being present in a solvent mixture comprising from about 55 to about 65 volume percent of methanol or acetone and from about 35 to about 45 volume percent water; and wherein said hydrophobic polyolefinic microporous substrate has a reduced bulk density as compared with the bulk density of a corresponding non-porous polyolefinic material, a crystallinity of at least about 30 percent, an average pore size of from about 100 to about 5000 Angstroms, a porosity of from about 40 to about 90%, and a surface area of at least about 10 m$^2$/gram.

2. The hydrophilic polyolefinic microporous material of claim 1, wherein said material when treated with said surfactant has an electrical resistance of less than about 15 milliohms-in$^2$.

3. The hydrophilic polyolefinic microporous material of claim 1, wherein said microporous material comprises a microporous film or hollow fiber.

4. The hydrophilic polyolefinic microporous material of claim 3, wherein said surfactant has an HLB of from about 12 to about 13.

5. The hydrophilic polyolefinic microporous material of claim 4, wherein said hydrophobic microporous substrate is impregnated with said surfactant in an amount sufficient to provide a surfactant add-on of from about 10 to about 15% by weight.

6. A hydrophilic polyolefinic microporous material comprising a hydrophilic polyolefinic open-celled microporous substrate having a reduced bulk density as compared with the bulk density of a corresponding non-porous polyolefinic material, a crystallinity of from about 50 to about 100 percent, an average pore size of from about 100 to about 5000 Angstroms, a porosity of from about 40 to about 90%, and a surface area of from about 20 to 100 m$^2$/g, impregnated with a nonionic surfactant of the class of alkylphenoxy poly(ethyleneoxy) ethanol compounds having an HLB in the range of from about 12 to 13 in a solvent mixture comprising from about 55 to about 65 volume percent of methanol and from about 35 to about 45 volume percent water in an amount sufficient to provide a surfactant add-on of from about 10 to about 15% by weight.

7. The hydrophilic polyolefinic microporous material of claim 6, wherein said microporous material is in the form of a film or hollow fiber.

8. A method for preparing a hydrophilic polyolefinic microporous material capable of multiple re-wetting with aqueous solutions comprising contacting a polyolefinic open-celled microporous substrate with a surfactant solution comprising at least one nonionic alkylphenoxy poly(ethyleneoxy) ethanol surfactant having an HLB in the range of from about 10 to 15 in a solvent mixture comprising from about 55 to about 65 volume percent of methanol or acetone and from about 35 to about 45 volume percent water in a manner sufficient to render said polyolefinic microporous substrate wettable with aqueous solutions.

9. The method of claim 8, wherein said surfactant solution comprises from about 1 to about 10% by weight of said alkylphenoxy poly(ethyleneoxy) ethanol surfactant in an approximately 60:40 volume percent methanol or acetone to water solvent mixture, and said polyolefinic microporous substrate is contacted with said solution in a manner sufficient to provide a surfactant add-on of from about 10 to about 15% by weight.

10. The method of claim 9, wherein said surfactant has an HLB of from about 12 to 13.

11. The method of claim 9, wherein said hydrophobic polyolefinic microporous substrate has a reduced bulk density as compared with the bulk density of a corresponding non-porous polyolefinic material, a crystallinity of from about 50 to about 100 percent, on average pore size of from about 100 to about 5000 Angstroms, a porosity of from about 40 to about 90%, and a surface area of from about 20 to 100 m$^2$/g.

12. A hydrophilic polyolefinic microporous material capable of multiple re-wetting with aqueous solutions comprising a normally hydrophobic polyolefinic open-celled microporous substrate impregnated with at least one nonionic surfactant of the class of alkylphenoxy poly(ethyleneoxy) ethanol compounds having an HLB in the range of from about 10 to about 15, said hydrophilic polyolefinic microporous material being prepared by contacting said normally hydrophobic polyolefinic microporous substrate with a solution of said alkylphenoxy poly(ethyleneoxy) ethanol surfactant in a solvent mixture comprising from about 55 to about 65 volume percent of acetone or methanol with from about 35 to about 45 volume percent of water in a manner sufficient to render said polyolefinic microporous material wettable with aqueous solutions, wherein said hydrophobic polyolefinic microporous substrate has a reduced bulk density as compared with the bulk density of a corresponding nonporous polyolefinic material, a crystallinity of at least about 30 percent, an average pore sizes of from about 100 to about 5000 Angstroms, a porosity of from about 40 to about 90%, and a surface area of at least above 10 m$^2$/gram.

13. The hydrophilic polyolefinic microporous material of claim 12, wherein said material is prepared by contacting said normally hydrophobic polyolefinic substrate with a surfactant solution comprising from about 1 to about 10% by weight of said alkylphenoxy poly(ethyleneoxy) ethanol surfactant in an approximately 60:40 volume percent methanol or acetone to water solvent mixture for a period of time sufficient to produce a surfactant add-on of from about 10 to about 15% by weight.

14. The hydrophilic polyolefinic microporous material of claim 13, wherein said microporous material is in the form of a film or hollow fiber.

* * * * *